US010246803B2

(12) United States Patent
Aguilar et al.

(10) Patent No.: US 10,246,803 B2
(45) Date of Patent: Apr. 2, 2019

(54) KNITTED WIRE CARRIER FOR WEATHER SEAL INSERT SUPPORT WITH LOCKSTITCHED REINFORCING WIRE

(71) Applicant: Hope Global, Division of NFA Corp., Cumberland, RI (US)

(72) Inventors: Jesus Aguilar, Cumberland, RI (US); Alexander Martinez, Pawtucket, RI (US); Ildeberto Rosa, Pawtucket, RI (US)

(73) Assignee: Hope Global, Division of NFA Corp., Cumberland, RI (US)

( * ) Notice: Subject to any disclaimer, the term of this patent is extended or adjusted under 35 U.S.C. 154(b) by 519 days.

(21) Appl. No.: 14/854,036

(22) Filed: Sep. 14, 2015

(65) Prior Publication Data

US 2017/0073862 A1    Mar. 16, 2017

(51) Int. Cl.
*D04B 21/20* (2006.01)
*D04B 21/12* (2006.01)
(Continued)

(52) U.S. Cl.
CPC ............ *D04B 21/205* (2013.01); *B60J 10/18* (2016.02); *D04B 21/12* (2013.01); *D04B 21/14* (2013.01);
(Continued)

(58) Field of Classification Search
CPC ...... D04B 21/205; D04B 21/12; D04B 23/12; D04B 21/14; D04B 21/20; F16J 15/104; F16J 15/102; F16J 15/108; B60J 10/18
See application file for complete search history.

(56) References Cited

U.S. PATENT DOCUMENTS

| 3,238,689 | A | | 3/1966 | Cook, Jr. |
| 3,430,387 | A | * | 3/1969 | Clapham ................. B60J 10/16 49/490.1 |

(Continued)

FOREIGN PATENT DOCUMENTS

| EP | 0175818 A1 | 4/1986 |
| EP | 0384613 A1 | 9/1990 |

(Continued)

*Primary Examiner* — Cephia D Toomer
(74) *Attorney, Agent, or Firm* — Loginov & Associates, PLLC; William A. Loginov

(57) ABSTRACT

This invention provides a knitted wire carrier for use in constructing a (e.g.) automotive weather seal that incorporates a locking stitch formed from a relatively incompressible and expansion-resisting material that passes through at least one of the warp threads adjacent to the wire weft. In an embodiment, the locking stitch constructed from a steel (or another metal) wire that is solid or braided. In other embodiments, the locking stitch can be constructed from fiberglass, monofilament polymer or another similarly performing material. In an embodiment, the lockstitch wire is constructed from approximately 0.5-millimeter diameter steel and the wire carrier is constructed from approximately 0.5-0.91-millimeter diameter steel. The wire lockstitch can be woven through a center warp yarn that is surrounded by other knitted warp yarns along the overall weft of the wire carrier. The wire carrier is coated with an adhesive, e.g., latex to maintain the knit in place.

16 Claims, 5 Drawing Sheets

(51) Int. Cl.
*D04B 23/12* (2006.01)
*D04B 21/14* (2006.01)
*F16J 15/10* (2006.01)
*B60J 10/18* (2016.01)

(52) U.S. Cl.
CPC ............. *D04B 21/20* (2013.01); *D04B 23/12* (2013.01); *F16J 15/102* (2013.01); *F16J 15/104* (2013.01); *F16J 15/108* (2013.01)

(56) References Cited

U.S. PATENT DOCUMENTS

| | | |
|---|---|---|
| 4,343,845 A | 8/1982 | Burden et al. |
| 4,413,033 A | 11/1983 | Weichman |
| 4,624,093 A | 11/1986 | Gibson |
| 4,748,078 A | 5/1988 | Doi et al. |
| 5,072,567 A | 12/1991 | Cook et al. |
| 5,143,666 A | 9/1992 | McManus et al. |
| 5,204,157 A | 4/1993 | Matsumiya |
| 5,416,961 A | 5/1995 | Vinay |
| 5,902,956 A | 5/1999 | Spies et al. |
| 6,150,003 A | 11/2000 | McCuthan, Jr. |
| 6,214,267 B1 | 4/2001 | Keys |
| 6,219,906 B1 | 4/2001 | Sosnowski |
| 6,461,713 B2 | 10/2002 | King |
| 6,761,954 B2 | 7/2004 | Hauser |
| 7,028,510 B1 | 4/2006 | DaRosa |

FOREIGN PATENT DOCUMENTS

| | | |
|---|---|---|
| FR | 2205072 A6 | 5/1974 |
| WO | 9914413 | 3/1999 |

* cited by examiner

KNITTED WIRE CARRIER FOR WEATHER SEAL INSERT SUPPORT WITH LOCKSTITCHED REINFORCING WIRE

FIELD OF THE INVENTION

This invention relates to wire carriers having a knitted stitching used as backing for elastomeric weather seals in automotive and other applications, such as electrical cabinets where maintaining weather impermeability is a critical attribute.

BACKGROUND OF THE INVENTION

Knitted wire carriers are commonly used in the area of automotive weather seals, among other uses. Generally, such carriers consist of a continuous wire weft formed into a serpentine propeller pattern with rounded ends. The ends join together a series of approximately propeller-shaped or parallel weft segments (limbs) upon which a plurality of warp threads is knitted. This type of knitted wire carrier is used as a reinforcing frame for elastomeric seals that are produced by extrusion and other continuous-forming processes. Such seals are often used in automotive and other vehicle applications.

The manufacture of extruded weather seals involves the application of substantial forming pressure to the wire carrier. The warp threads in many examples are applied in clusters or strips, all of which are designed to maintain the serpentine (also informally termed "zig-zag") wire weft the appropriately spaced orientation during the formation process. Absent these warp threads, the wire would tend to stretch and deform, generating an inferior or unusable finished seal product.

Wire carriers are an efficient mechanism for constructing a weather seal. However in certain application they experience excess compressibility or elongation—for example when the weather seal is fitted around a tight-radius corner. That is, the seal compresses or stretches and does not maintain the desired, conforming profile on the door, trunk, etc.

One prior art approach to reduce excess compressibility and elongation in weather seals is to reinforce with elastomeric seal element with a perforated metal (e.g. low carbon steel) strip. Such a strip 100 in an unfolded orientation is shown by way of background in FIG. 1. The specific geometry of the strip 100, as well as its overall width, length, thickness, are highly variable depending on the weather seal application and desired performance characteristics. In an embodiment, the strip 100 has an overall width SW of approximately 20-65 millimeters and a thickness (perpendicular to the page of the figure) of between approximately 0.3 and 0.76 millimeters (e.g. 0.45 millimeters). The exemplary strip 100 includes a series of regular edge slots 110, formed along each opposing edge, having a width WS of between approximately 1 and 3 millimeters, and a series of central slots 120 offset from the edge slots 110 as shown. The strip can be formed into a desired shape (e.g. folding, stretching, etc.) and molded into a weather seal. The completed seal is capable of bending around sharp corners without significant puckering, wrinkling, compression or elongation.

This perforated, low carbon steel strip requires a large quantity of sheet metal to produce (weight-per-unit-of-length) and employs involved stamping or cutting equipment, dies, etc.

SUMMARY OF THE INVENTION

This invention overcomes the disadvantages of the prior art by providing a knitted wire carrier for use in constructing an (e.g.) automotive weather seal that incorporates a locking stitch, commonly called a "lockstitch" formed from a relatively incompressible and expansion-resistant material that passes through at least one of the warp threads adjacent to the wire weft. In an embodiment, the lockstitch constructed from a steel (or another metal) wire that is solid or braided. In other embodiments, the lockstitch can be constructed from fiberglass, monofilament polymer or another similarly performing material. In an embodiment, the lockstitch wire is constructed from approximately 0.5-millimeter diameter steel and the wire carrier is constructed from approximately 0.5-0.91-millimeter diameter steel. The wire lockstitch can be knitted through a center warp yarn that is surrounded by other knitted warp yarns along the overall weft of the wire carrier.

In an illustrative embodiment a knitted wire carrier for use in a weather seal includes a wire weft formed in a serpentine pattern and defining a width between alternating edge bends perpendicular to an elongated length. A plurality of knitted warp yarns extend in the direction of the elongated length and are located at positions along the width of the wire weft. At least a first compression and expansion-resisting wire is woven as a lock stitch to at least one of the warp yarns. Illustratively, the wire weft can comprise a steel wire and the first compression and expansion-resisting wire comprises a steel wire. More particularly, the wire weft can define a diameter of between approximately 0.5 and 0.91 (more particularly, 0.09085) millimeter and the first compression and expansion-resisting wire can define a diameter of between approximately 0.3 and 0.76 millimeter, and more a diameter of approximately 0.5 millimeter. Illustratively, the warp yarns can be constructed from a polyester material, or any other acceptable material or blend. In various embodiments, the wire carrier can be coated with an adhesive material that maintains the warp yarns in a desired position on the wire weft, such as a latex coating. In various embodiments, a second compression and expansion-resisting wire can be knitted as a lockstitch to at least one of the warp yarns. This second wire is typically located at a spacing along the width of the wire weft from the first compression and expansion-resisting wire. In embodiments, the first compression and expansion-resisting wire is approximately centered along the width of the wire weft. In embodiments, the first and/or second compression and expansion-resisting wire is/are constructed from a non-metallic material, such as fiberglass. Illustratively, the weather seal can be applied to a variety of moisture/weather-tight and/or moisture/weather-resistant structures including, but not limited to, vehicles, boats, aircraft, utility cabinets, doors, electrical enclosures, etc.

In an illustrative embodiment a method for constructing wire carrier with a knitting machine is provided. This method includes the step of feeding and forming a wire into a wire weft defining a serpentine pattern having a width between alternating edge bends perpendicular to an elongated length. Warp yarns are knitted so that they extend in the direction of the elongated length and are locate at various spaced-apart positions along the width of the wire weft using weaving needles in a needle guide. In addition, at least a first compression and expansion-resisting wire is knitted as a lock stitch to at least one of the warp yarns. The first compression and expansion-resisting wire is knitted by the machine with the needle bed containing a slot for a dummy needle necessary to place the expansion-resisting wire.

BRIEF DESCRIPTION OF THE DRAWINGS

The invention description below refers to the accompanying drawings, of which.

DETAILED DESCRIPTION

Figure 1:
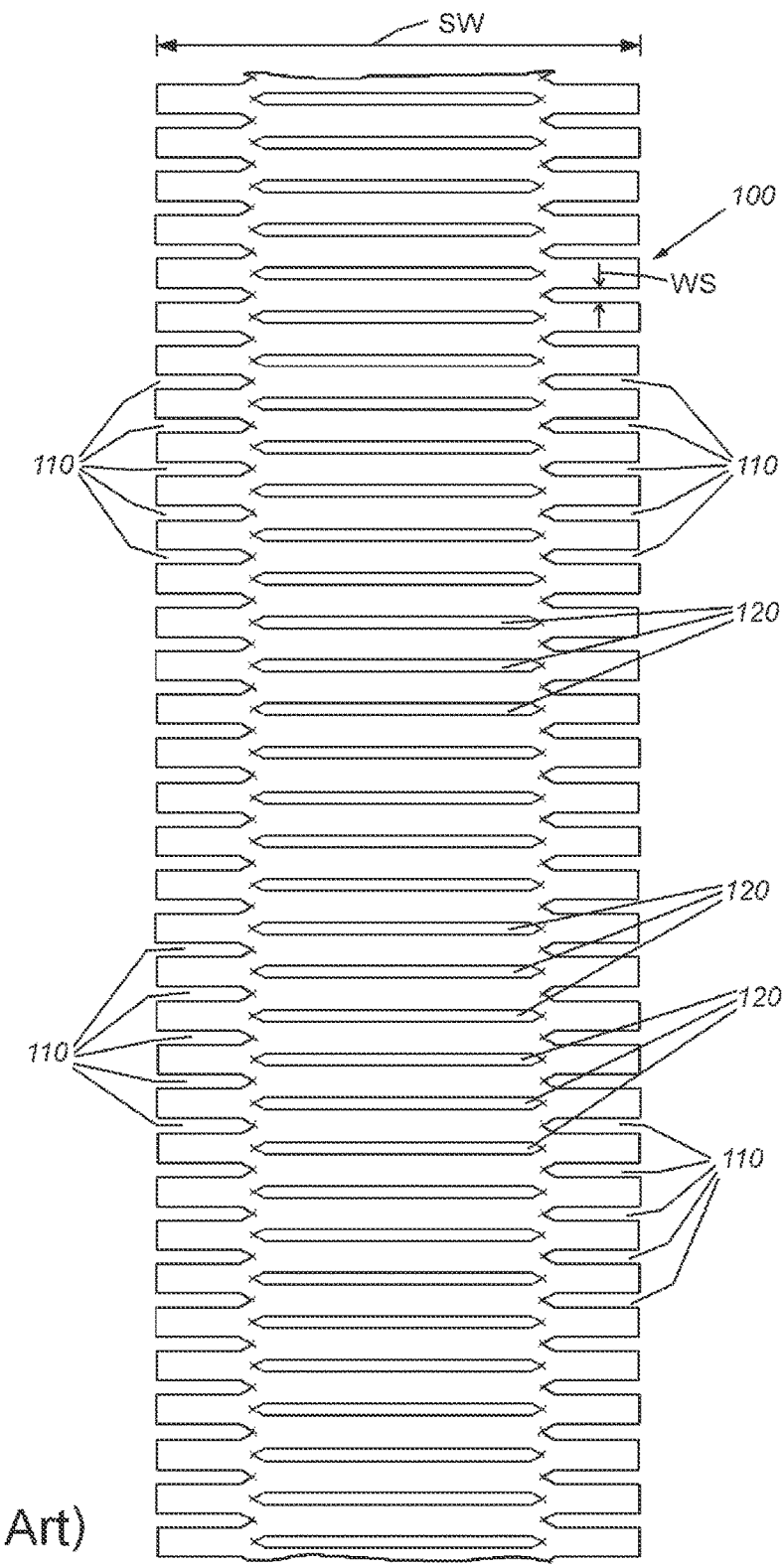
FIG. 1 is a diagram of a perforated steel strip used to reinforce an elastomeric weather seal according to the prior art.
Figure 2:
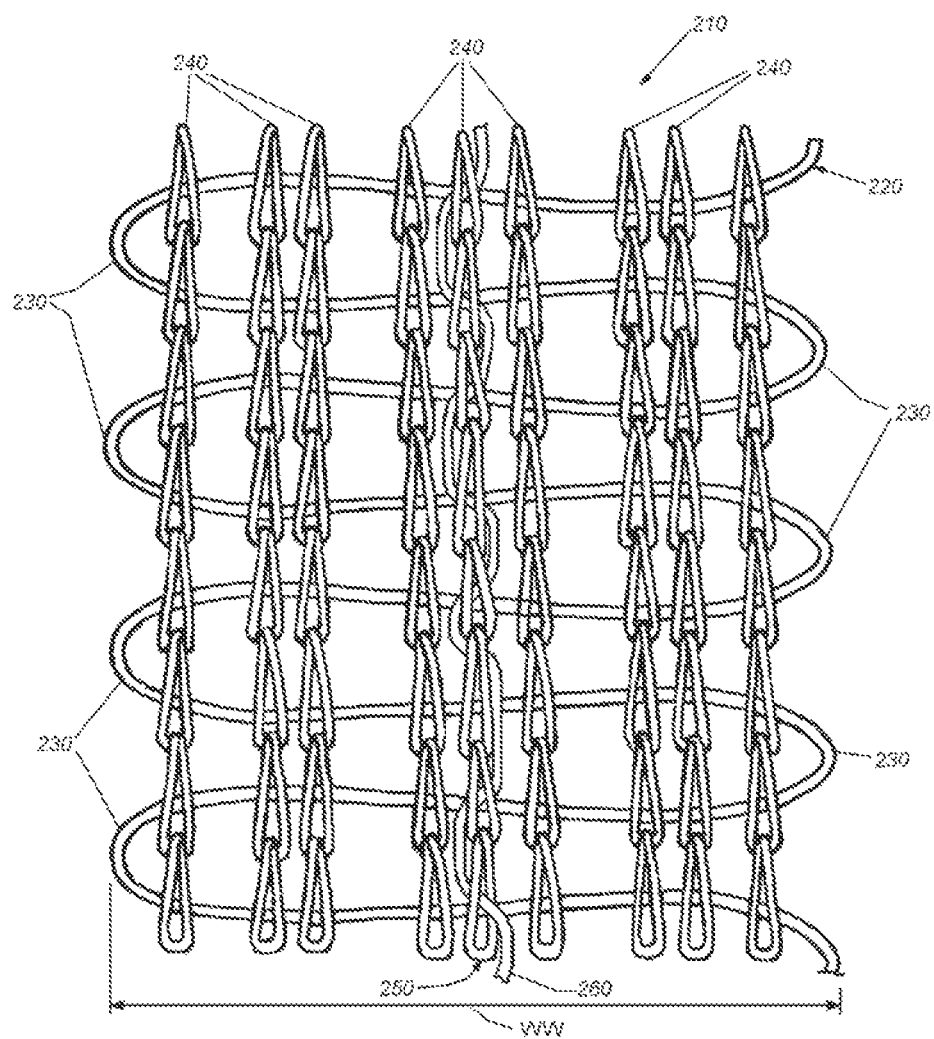
FIG. 2 is a diagram of a knitted wire carrier including a compression and expansion-resisting lockstitch, located around the center of the carrier width, for use in reinforcing an automotive weather seal according to an illustrative embodiment.

A segment knitted wire carrier 210 according to an embodiment of this invention is shown in FIG. 1. This carrier 210 consists of a serpentine bent wire 220. This wire can be constructed from a variety of deformable materials. For example the wire 220 can be low-carbon steel, galvanized steel or aluminum alloy having a diameter of between approximately 0.02 and 0.045 inch (approximately 0.5 millimeters to 1.14 millimeters). In certain embodiments, the wire 220 can be coated with an anti-rust/anti-corrosion coating or plating. When manufactured, the wire 220 is bent generally in a planar fashion, and is formed into a continuous strip by a swinging, back and forth motion (for forming the weft) of a knitting machine that can be conventional in design. The strip has a generally constant width W between the bend apices 130 on each opposing side. In one example, that width W is approximately 1¼-1⅝ inches (31.75 to 42.54 millimeters). However, the width WW of the wire carrier is highly variable depending, in part, upon the selected application for which it is used.

The bent wire 220 essentially defines the weft, about which a series of warp yarns 240 are knitted. These warp yarns, as discussed above, maintain the relative shape and spacing of the bent wire segments and provide a further substrate for elastomeric/polymeric weather seal material (not shown) to adhere to the carrier 210. In this example, the warp yarns 240 are generally specifically spaced divided into various patterns across the width. In this embodiment, the yarns are constructed from polyester with a Denier of approximately 1000 and between approximately 140-300 filaments. Note that this specification for warp yarns is only exemplary and that a wide range of materials, denier and filament counts are expressly contemplated.

By way of non-limiting example, the wire's bend apices 230 are connected to curved wire bend segments that define a wider spread than the spread between adjacent central wire segments. By having a wider spread between adjacent wires near the ends than in the center, the carrier defines the general outline appearance of a "propeller" blade. This conventional shape is used in part, to maintain the edge warps and near or at the apices since they must "climb over" the widened spread between segments to creep into the middle. Additionally, the warps are adhered to the carrier using, for example a layer of latex that holds the warps in place on the wire 220. The latex can be applied after the knitting process is completed using a spray nozzle or a dip tank.

Notably, the center warp yarn 250 locked using a lockstitch 260 that weaves in and out of the knit. This lock stitch wire 260 is illustratively constructed from 0.02-inch (0.5 millimeter) steel wire. The diameter of the wire 260 can be highly variable (e.g. 0.3-0.76 millimeter) in alternate embodiments. The wire lockstitch serves to resist both expansion and compression of the carrier when it is encased in weather seal polymer and bent around shapes of various curvatures. That is, the lockstitch wire 260 imparts internal stiffness in the direction of elongation of the weather seal.

Figure 3:
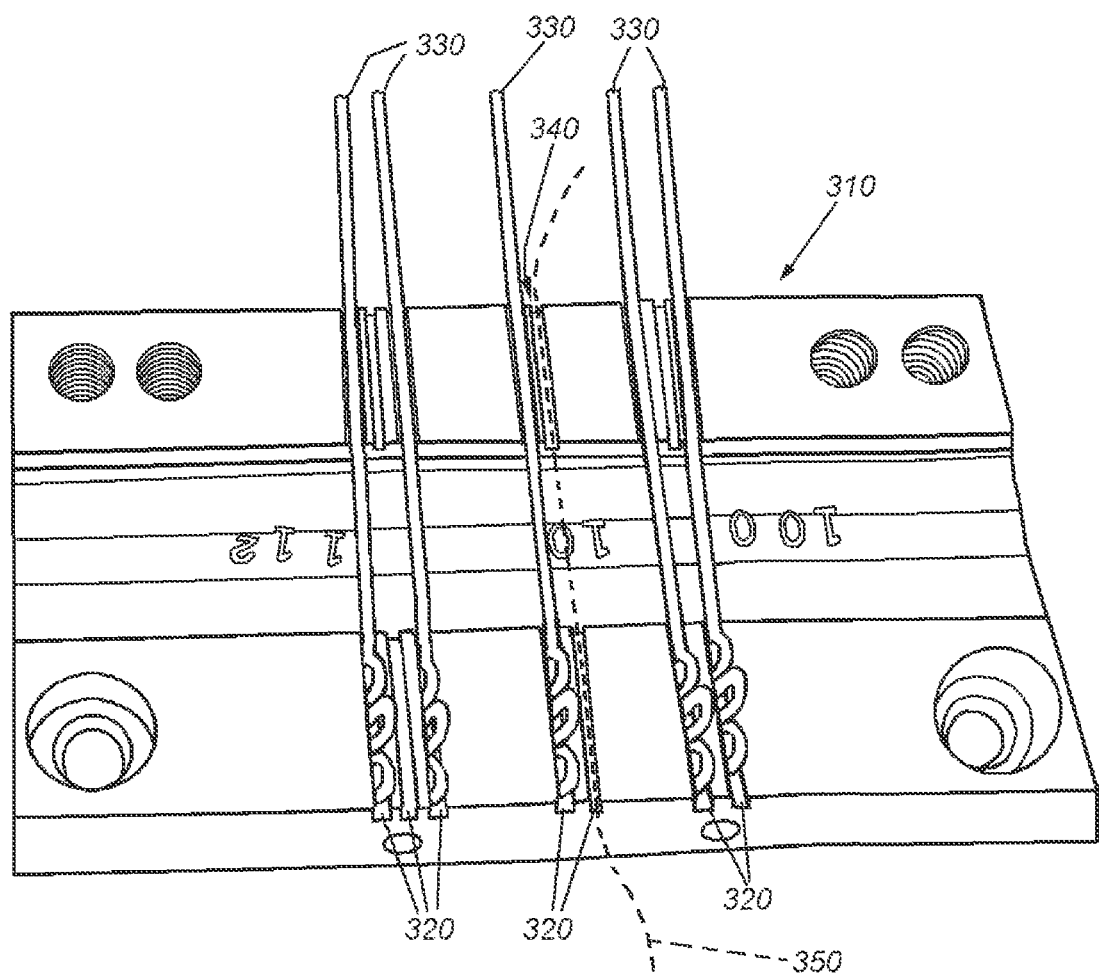
FIG. 3 is a perspective view of a knitting weaving needle bed showing an empty slot for placement of a wire lockstitch according to an illustrative embodiment.

The expansion and compression-resisting wire can be secured to the carrier in various ways. In embodiments it can be spot-welded to the wire carrier. It can be separately tied and/or adhesives can be employed. A weaving needle bed block 310 of conventional design is shown in FIG. 3. The bed block 310 includes slots 320 that hold stationary conventional knitting needles 330 used to knit the warp yarns to appropriate location along the width of the wire carrier. The general setup of the knitting machine facilitates use of an empty slot 340 of the weaving needle bed block 320 to guide the lock stitch wire (represented by dashed-line 350). This can be termed a "dummy needle". The wire (350) is drawn into the overall carrier knit as it is paid out of the knitting machine. The wire can reside on a driven (or non-driven) feed roll and is fed to the carrier as it moves out of the knitting machine. This arrangement should be clear to those of skill in the art.

Figure 4:
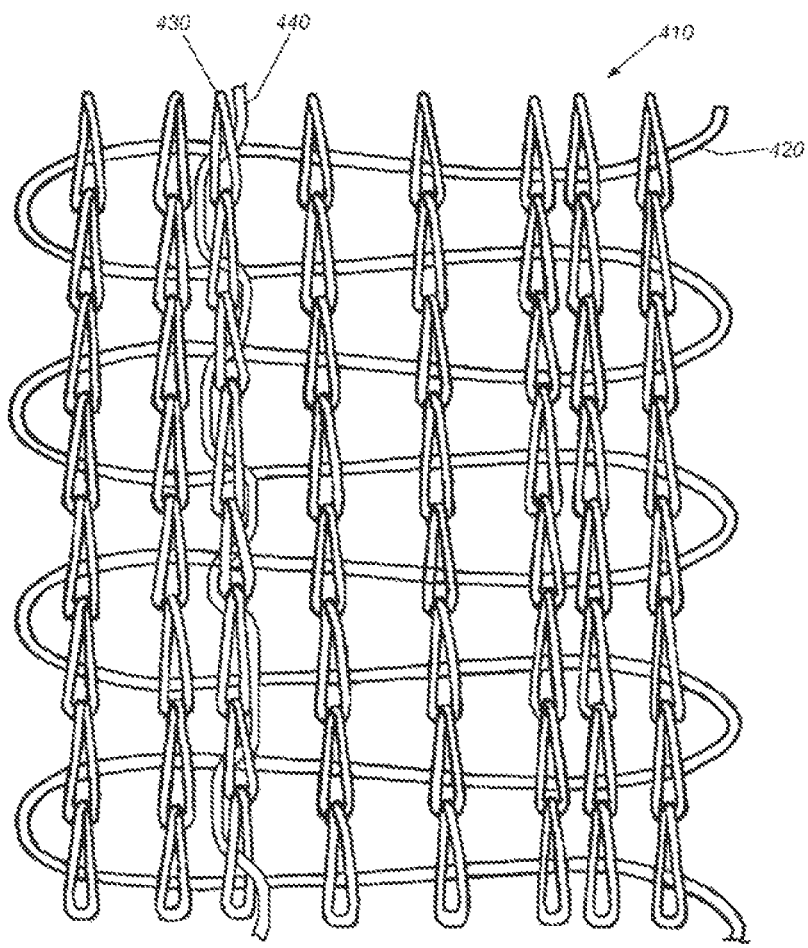
FIG. 4 is a diagram of a knitted wire carrier including compression and expansion-resisting lockstitch located on one side of the carrier width according to an alternate embodiment.

Reference is now made to FIG. 4, which shows a knitted wire carrier 410 according to an alternate embodiment (and constructed as described above), in which the compression and expansion-resisting lockstitch wire 440 is located within a knit 430 adjacent to an edge of the wire weft 420 of carrier 410 (i.e. in a non-centered arrangement). This positioning can be desirable in certain weather seal configurations where locating the wire closer to one side can assist in allowing the seal to bend and/or remain in place. Note that the expansion and compression-resisting wire 440 can be located at any point along the width of the carrier in various embodiments so as to achieve a desired performance characteristic in the weather seal.

Figure 5:
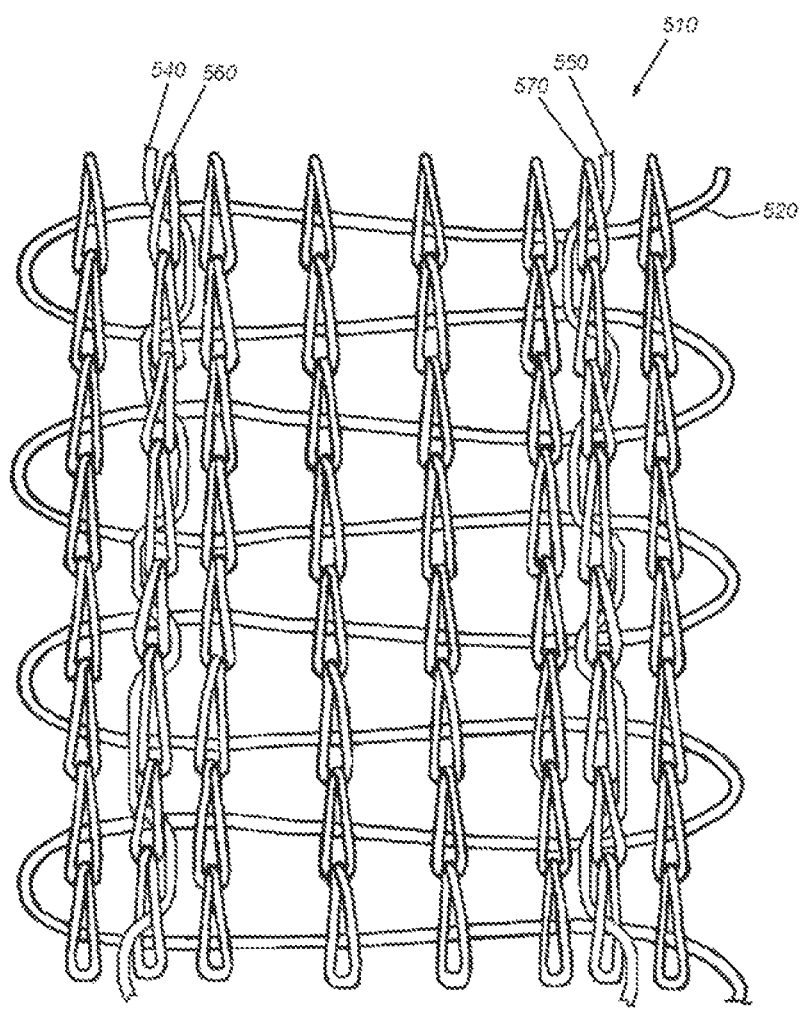
FIG. 5 is a diagram of a knitted wire carrier including a pair of compression and expansion-resisting lockstitches located on each side of the carrier width according to an alternate embodiment.

As shown in the further example of FIG. 5, the wire carrier 510 can include a plurality of compression and expansion-resisting wires 540 and 550 knitted into appropriate knits 560 and 570, respectively, along the width of the wire weft 520. The placement of each wire is variable. In this embodiment, wires are placed on opposite sides of the overall width. In alternate embodiments, wires can be placed asymmetrically with respect to the overall width—for example, one wire centered on the width and one wire adjacent to an edge of the carrier. Again, such arrangements of wires can depend upon desired performance characteristics for the weather seal and the geometry of the bends it will experience on (e.g. the vehicle door).

The term, "wire", as used herein to describe a compression and expansion-resisting structure knitted (e.g. as a lockstitch) into the wire carrier should be taken broadly to include a variety of solid and multi-filament flexible, elongated structures (cordage, etc.) capable of being woven into a zig-zag wire weft, and providing desired performance characteristics. For example, the "wire" can be a fiberglass yarn or cord, an aramid (e.g. Kevlar®) material, a variety of solid or braided metals/alloys (e.g. aluminum, copper, brass, titanium, stainless steel, etc.) and/or certain polymers (e.g. monofilament polyester or polypropylene) and/or combinations of such materials. In the illustrative embodiment, solid core low carbon steel is employed.

It should be clear that the wire carrier constructed in accordance with the embodiments herein provides superior performance in resisting both short-term and long-term compression and expansion, and is relatively straightforward to manufacture using conventional knitting machinery.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, also as used herein, various directional and orientational terms (and grammatical variations thereof) such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances (e.g. 1-2%) of the system. Accordingly, this description is meant to be taken only by way of example, and not to otherwise limit the scope of this invention.

What is claimed is:

1. A knitted wire carrier for use in a weather seal comprising:
    a wire weft formed in a serpentine pattern and defining a width between alternating edge bends perpendicular to an elongated length;
    a plurality of knitted warp yarns extending in the direction of the elongated length and located at positions along the width of the wire weft; and
    at least a first compression and expansion-resisting wire knitted as a lockstitch to at least one of the warp yarns.

2. The knitted wire carrier as set forth in claim 1 wherein the wire weft comprises a steel wire and the first compression and expansion-resisting wire comprises a steel wire.

3. The knitted wire carrier as set forth in claim 2 wherein the wire weft defines a diameter of between approximately 0.5 and 0.91 millimeter and the first compression and expansion-resisting wire defines a diameter of between approximately 0.3 and 0.76 millimeter.

4. The knitted wire carrier as set forth in claim 3 wherein the first compression and expansion-resisting wire defines a diameter of approximately 0.5 millimeter.

5. The knitted wire carrier as set forth in claim 2 wherein the warp yarns are constructed from a polyester material.

6. The knitted wire carrier as set forth in claim 2 wherein the wire carrier is coated with an adhesive material that maintains the warp yarns in a desired position on the wire weft.

7. The knitted wire carrier as set forth in claim 6 wherein the adhesive material comprises a latex coating.

8. The knitted wire carrier as set forth in claim 1 further comprising at least a second compression and expansion-resisting wire knitted as a lockstitch to at least one of the warp yarns, located at a spacing along the width of the wire weft from the first compression and expansion-resisting wire.

9. The knitted wire carrier as set forth in claim 1 wherein the first compression and expansion-resisting wire is approximately centered along the width of the wire weft.

10. The knitted wire carrier as set forth in claim 1 wherein the first compression and expansion-resisting wire is constructed from a non-metallic material.

11. The knitted wire carrier as set forth in claim 1 wherein the non-metallic material comprises fiberglass.

12. A weather seal including the knitted wire carrier of claim 1.

13. The weather seal of claim 12 constructed and arranged for attachment in at least one of a vehicle and a moisture-tight cabinet.

14. A method for constructing wire carrier with a knitting machine comprising the steps of:
    feeding and forming a wire into a wire weft defining a serpentine pattern having a width between alternating edge bends perpendicular to an elongated length;
    knitting warp yarns extending in the direction of the elongated length and located at positions along the width of the wire weft using knitting needles in a needle bed; and
    feeding a first compression and expansion-resisting wire as a lockstitch to at least one of the warp yarns.

15. The method as set forth in claim 14 wherein the step of feeding the first compression and expansion-resisting wire with the needle bed as a dummy needle.

16. The method as set forth in claim 14 further comprising applying an adhesive coating to the wire carrier to maintain the warp yarns in position of the wire weft.

* * * * *